United States Patent
Lu et al.

(10) Patent No.: US 11,563,691 B2
(45) Date of Patent: Jan. 24, 2023

(54) TIME-DIVISION MULTIPLEXING SCHEDULER AND SCHEDULING DEVICE

(71) Applicant: REALTEK SEMICONDUCTOR CORPORATION, Hsinchu (TW)

(72) Inventors: Kuo-Cheng Lu, Hsinchu (TW); Yu-Mei Pan, Hsinchu (TW); Yung-Chang Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/542,534

(22) Filed: Dec. 6, 2021

(65) Prior Publication Data
US 2022/0200925 A1    Jun. 23, 2022

(30) Foreign Application Priority Data
Dec. 18, 2020 (TW) ................................ 109145149

(51) Int. Cl.
*H04L 47/6275* (2022.01)
*H04L 49/50* (2022.01)
*H04L 49/351* (2022.01)

(52) U.S. Cl.
CPC ........ *H04L 47/6275* (2013.01); *H04L 49/351* (2013.01); *H04L 49/501* (2013.01)

(58) Field of Classification Search
CPC .. H04L 47/6275; H04L 49/351; H04L 49/501
See application file for complete search history.

(56) References Cited

U.S. PATENT DOCUMENTS

| | | | | |
|---|---|---|---|---|
| 6,728,270 | B1 * | 4/2004 | Meggers | H04N 21/64792 370/473 |
| 2005/0047425 | A1 * | 3/2005 | Liu | H04L 47/50 370/411 |
| 2006/0221850 | A1 * | 10/2006 | Buckley | H04L 47/2441 370/395.43 |
| 2010/0215057 | A1 * | 8/2010 | Frink | H04N 21/643 370/474 |
| 2014/0185628 | A1 * | 7/2014 | Matthews | H04L 47/50 370/412 |

* cited by examiner

*Primary Examiner* — Luat Phung
(74) *Attorney, Agent, or Firm* — WPAT, PC

(57) ABSTRACT

Disclosed is a time-division multiplexing (TDM) scheduler capable of determining a service order for serving N packet transmission requesters. The TDM scheduler includes: N current count value generators configured to serve the N packet transmission requesters respectively, and generate N current count values according to parameters of the N packet transmission requesters, a previous scheduling result generated by the EDD scheduler previously, and a predetermined counting rule; and an earliest due date (EDD) scheduler configured to generate a current scheduling result for determining the service order according to the N current count values and a predetermined urgency decision rule, wherein an extremum of the N current count values relates to one of the N packet transmission requesters, and the EDD scheduler selects this requester as the one to be served preferentially.

17 Claims, 7 Drawing Sheets

| time slots | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| top-priority target | MG1 | MG2 | MG3 | MG4 | MG1 | MG2 | MG3 | MG5 | MG1 | MG2 | MG3 | MG4 | MG1 | MG2 | MG3 | MG6 | MG1 |
| current count value of MG1 | 0 | 3 | 2 | 1 | 0 | 3 | 2 | 1 | 0 | 3 | 2 | 1 | 0 | 3 | 2 | 1 | 0 |
| current count value of MG2 | 0 | 0 | 3 | 2 | 1 | 0 | 3 | 2 | 1 | 0 | 3 | 2 | 1 | 0 | 3 | 2 | 1 |
| current count value of MG3 | 0 | 0 | 0 | 3 | 2 | 1 | 0 | 3 | 2 | 1 | 0 | 3 | 2 | 1 | 0 | 3 | 2 |
| current count value of MG4 | 1 | 1 | 1 | 1 | 8 | 7 | 6 | 5 | 4 | 3 | 2 | 1 | 8 | 7 | 6 | 5 | 4 |
| current count value of MG5 | 1 | 1 | 1 | 1 | 1 | 1 | 1 | 1 | 16 | 15 | 14 | 13 | 12 | 11 | 10 | 9 | 8 |
| current count value of MG6 | 1 | 1 | 1 | 1 | 1 | 1 | 1 | 1 | 1 | 1 | 1 | 1 | 1 | 1 | 1 | 1 | 16 |

Fig. 5 first circumstance

| time slots | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|
| top-priority target | MG2 | | | | MG1 | | | | | MG1 | MG2 | | | | MG1 | | ... |
| current count value of MG1 | 5 | 4 | 3 | 2 | 1 | 5 | 4 | 3 | 2 | 1 | 5 | 4 | 3 | 2 | 1 | 5 | ... |
| current count value of MG2 | 1 | 10 | 9 | 8 | 7 | 6 | 5 | 4 | 3 | 2 | 1 | 10 | 9 | 8 | 7 | 6 | ... | second circumstance

| time slots | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|
| top-priority target | MG2 | | | MG1 | | | | MG1 | MG2 | | | MG1 | | | | MG1 | ... |
| current count value of MG1 | 5 | 4 | 3 | 2 | 5 | 4 | 3 | 2 | 5 | 4 | 3 | 2 | 5 | 4 | 3 | 2 | ... |
| current count value of MG2 | 1 | 10 | 9 | 8 | 7 | 6 | 5 | 4 | 1 | 10 | 9 | 8 | 6 | 5 | 4 | 3 | ... | subtracting compensation value     subtracting compensation value     subtracting compensation value

Fig. 6

TIME-DIVISION MULTIPLEXING SCHEDULER AND SCHEDULING DEVICE

BACKGROUND OF THE INVENTION

1. Field of the Invention

The present disclosure relates to a scheduler and scheduling device, especially to a time-division multiplexing scheduler and scheduling device.

2. Description of Related Art

A general switch (e.g., an Ethernet switch) performs packet transmission of multiple transmission ports with a time-division multiplexing (TDM) technology; more specifically, the switch performs packet transmission of a single transmission port within a time slot, and performs packet transmission of multiple transmission ports in predetermined order within multiple time slots respectively. When the sum of I/O bandwidths of the multiple transmission ports is larger than a core bandwidth of the switch, the switch cannot satisfy the bandwidth demands of all the multiple transmission ports, and this is called oversubscription (OS). In an oversubscription circumstance, based on the attributes of the multiple transmission ports, the switch will satisfy total bandwidth demands of those transmission ports in a line rate mode and satisfy partial bandwidth demands of those transmission ports in an oversubscription mode.

On the basis the above, in regard to a general switch engineers have to work out multiple TDM tables including a line rate TDM table and an oversubscription TDM table for determining the aforementioned predetermined order and accordingly allocate time slots to multiple transmission ports of the switch for packet transmission. However, this manner needs a lot of manpower to work out different TDM tables for different numbers of transmission ports in view of these transmission ports' attributes and bandwidth demands; additionally, this manner is hard to equally allocate bandwidths to those transmission ports in the oversubscription mode.

SUMMARY OF THE INVENTION

An object of the present disclosure is to provide a time-division multiplexing (TDM) scheduler and scheduling device for preventing the problems of the prior art.

An embodiment of the TDM scheduler of the present disclosure is capable of determining service order for serving N packet transmission requesters, wherein the N is an integer greater than one. This embodiment includes N current count value generators and an earliest due date (EDD) scheduler. The N current count value generators are configured to serve the N packet transmission requesters respectively, and to generate N current count values according to parameters of the N packet transmission requesters, a previous scheduling result, and a predetermined counting rule. The EDD scheduler are configured to generate a current scheduling result according to the N current count values and a predetermined urgency decision rule, wherein the current scheduling result determines the service order for serving the N packet transmission requesters, and the previous scheduling result is generated by the EDD scheduler prior to the generation of the current scheduling result.

Another embodiment of the TDM scheduler of the present disclosure is capable of determining service order for serving N packet transmission requesters, wherein the N is an integer greater than one, and the N packet transmission requesters include a first requester and a second requester. This embodiment includes N current count value generators and an EDD scheduler. The N current count value generators are configured to serve the N packet transmission requesters respectively; each of the N current count value generators is configured to generate a count value, and the N current count value generators are configured to generate N current count values; and the N current count value generators includes a first count value generator and a second count value generator for serving the first requester and the second requester respectively. The first (second) count value generator includes: a first (second) storage circuit configured to store first (second) parameter setting for the first (second) requester; and a first (second) counting circuit configured to update a first (second) previous count value according to first (second) input parameters and a predetermined counting rule and thereby generate a first (second) current count value of the N current count values, wherein the first (second) input parameters include the first (second) parameter setting and the first (second) previous count value, the first (second) previous count value is originated from a previous scheduling result, both the first (second) previous count value and the first (second) current count value fall within a first (second) counting range, and the first (second) counting range is determined by the first (second) parameter setting and includes a first (second) extreme value. The EDD scheduler is configured to generate a current scheduling result according to the N current count values and a predetermined urgency decision rule, wherein the current scheduling result is used for determining the service order. For example, an extreme value of the N current count values is related to one of the N packet transmission requesters, and the EDD scheduler selects the packet transmission requester related to the extreme value as a top-priority target according to the predetermined urgency decision rule.

An embodiment of the TDM scheduling device of the present disclosure includes a TDM scheduler and a transmission port scheduler. TDM scheduler includes N current count value generators and an EDD scheduler. The N current count value generators are configured to serve the N packet transmission requester groups respectively, and to generate N current count values according to parameters of the N packet transmission requester groups, a previous scheduling result, and a predetermined counting rule. The EDD scheduler is configured to generate a current scheduling result according to the N current count values and a predetermined urgency decision rule. The transmission port scheduler includes N scheduling circuits and a multiplexer. The N scheduling circuits are configured to serve the N packet transmission requester group respectively; each of the N packet transmission requester groups includes one or more transmission ports, a first group of the N packet transmission requester groups is served by one of the N scheduling circuits which selects a target transmission port from the transmission port(s) of the first group, the first group is any of the N packet transmission requester groups, and the N scheduling circuits select N target transmission ports in total. The multiplexer is configured to output a transmission port selection signal according to the current scheduling result indicative of a top-priority group of the N packet transmission requester groups. The transmission port selection signal indicates that one of the N target transmission ports is selected as a select transmission port, the select transmission port is one of M transmission port(s) of the top-priority group and allowed to transmit packets, and the M is a positive integer.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 5 shows a time slot allocation result of the exemplary application of FIG. 4.

FIG. 6 shows how a compensation value is applied to a time slot allocation result.

DETAILED DESCRIPTION OF THE PREFERRED EMBODIMENTS

The time-division multiplexing (TDM) scheduler and scheduling device of the present disclosure can automatically allocate time slots to multiple packet transmission requesters (hereafter referred to as requesters for concision), and thereby economize manpower greatly and work out a plan of time slot allocation quickly. The TDM scheduler and scheduling device can be applied to a network device (e.g., an Ethernet switch), but their applications are not limited thereto.

Figure 1:
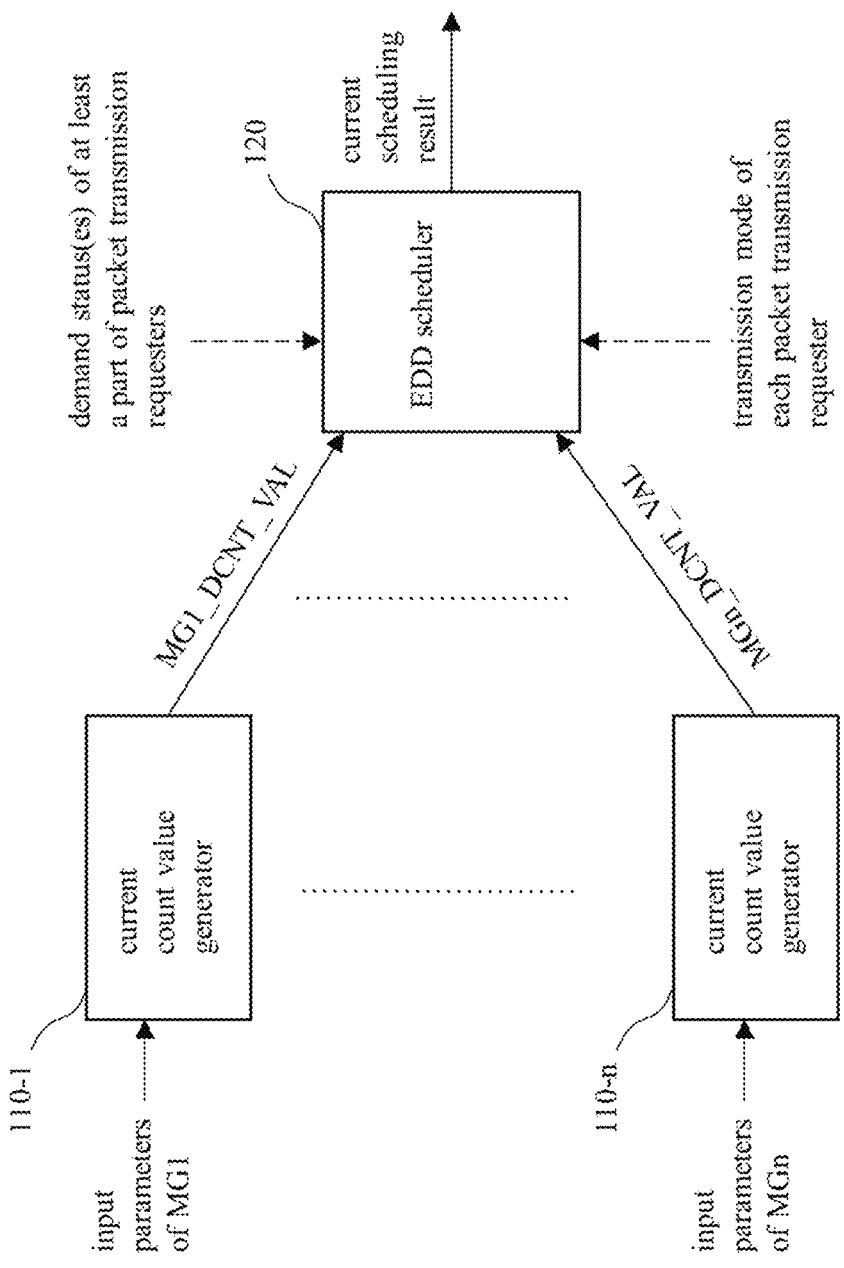
FIG. 1 shows an embodiment of the time-division multiplexing (TDM) scheduler of the present disclosure.

FIG. 1 shows an embodiment of the TDM scheduler of the present disclosure. The TDM scheduler 100 of FIG. 1 can determine service order for serving N requesters MG1~MGn (e.g., N media access control groups (MAC groups), each of which includes at least one transmission port), wherein the N is an integer greater than one. The TDM scheduler 100 includes N current count value generators 110-1~110-$n$ and an earliest due date (EDD) scheduler 120.

Figure 2:
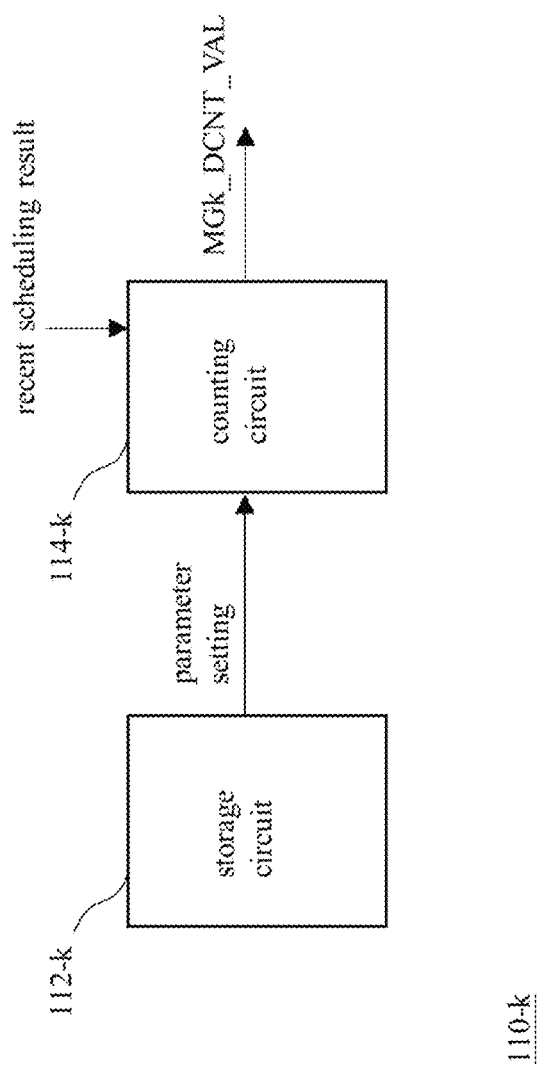
FIG. 2 shows an embodiment of each current count value generator of FIG. 1.

Please refer to FIG. 1. The N current count value generators 110-1~110-$n$ are configured to serve the N requesters MG1~MGn respectively. Each of the N current count value generators 110-1~110-$n$ is configured to generate a count value MGk_DCNT_VAL ($1 \leq k \leq n$), and thus the N current count value generators 110-1~110-$n$ are configured to generate N current count values MG1_DCNT_VAL~MGn_DCNT_VAL in total. An embodiment of each current count value generator 110-$k$ ($1 \leq k \leq n$) includes a storage circuit 112-$k$($1 \leq k \leq n$) (e.g., a register) and a counting circuit 114-$k$($1 \leq k \leq n$) as shown in FIG. 2. The storage circuit 112-$k$ is configured to store parameter setting for the requester MGk. The counting circuit 114-$k$ is configured to update a previous count value according to input parameters (e.g., the parameter setting for the requester MGk and a previous scheduling result as mentioned in a later paragraph) of the requester MGk and a predetermined counting rule, and thereby generate a current count value MGk_DCNT_VAL of the requester MGk, wherein the previous count value in a $k^{th}$ time slot is equal to the current count value in a $(k-1)^{th}$ time slot. People having ordinary skill in the art can refer to the present disclosure to use a known/self-developed counter and control circuit (not shown) to implement the counting circuit 114-$k$, wherein the control circuit is configured to start and suspend the counting operation of the counter and to reset the counter (i.e., to reload the counter with an initial count value).

An embodiment of the aforementioned predetermined counting rule includes a down-counting/up-counting rule and an exception rule. In a circumstance that the input parameters do not meet any of the exception rule's requirements, the counting circuit 114-$k$ makes its previous count value be equal to the previous count value minus/plus a predetermined value (e.g., one) and thereby generates its current count value. In a circumstance that the input parameters meet at least one of the exception rule's requirements, the counting circuit 114-$k$ executes at least one of the following operations according to the kind(s) of the satisfied requirement(s):

(1) If the requester MGk is selected as a top-priority target in a $K^{th}$ time slot or it gives up its transmission opportunity in the $K^{th}$ time slot, reloading the counting circuit 114-$k$ with its initial count value MGk_DCNT_INIT (mentioned in a later paragraph) that will be used as the current count value of the counting circuit 114-$k$ in the $(K+1)^{th}$ time slot;

(2) If the requester MGk is not selected as the top-priority target and the previous count value of the counting circuit 114-$k$ in the $(K+1)^{th}$ time slot (i.e., the current count value of the counting circuit 114-$k$ in the $K^{th}$ time slot) is an extreme value (e.g., minimum/maximum value) in this counting circuit's counting range, outputting the current count value of the counting circuit 114-$k$ in the $K^{th}$ time slot as the current count value of the counting circuit 114-$k$ in the $(K+1)^{th}$ time slot; and (3) If the requester MGk is set in the oversubscription mode and selected as a top-priority target in a $K^{th}$ time slot, when the current count value of the counting circuit 114-$k$ in the $K^{th}$ time slot is not equal to the extreme value in this counting circuit's counting range, making a previous count value of each of the other counting circuits in the oversubscription mode in the $(K+1)^{th}$ time slot be equal to the previous count value minus/plus a compensation value (e.g., the predetermined value plus a step value as mentioned in a later paragraph), and thereby generating the current count value of the counting circuit in the $(K+1)^{th}$ time slot.

In this embodiment, the input parameters of the requester MGk include this requester's parameter setting and previous count value, and the parameter setting includes the initial count value MGk_DCNT_INIT of the counting circuit 114-$k$. Both the previous count value and the current count value of the requester MGk fall within a counting range; the counting range is determined by the parameter setting and includes an extreme value (e.g., the minimum/maximum value in the counting range) while the opposite extreme value (e.g., the maximum/minimum value in the counting range) in the counting range can be used as the previous count value in the beginning; and the counting range (i.e., the maximum value minus the minimum value) is proportional to the bandwidth allocated to the requester MGk.

The previous count value of the requester MGk is originated from a previous scheduling result. More specifically, the current scheduling result generated by the EDD scheduler 120 for the $(K-1)^{th}$ time slot is treated as the previous scheduling result for the $K^{th}$ time slot and outputted to the N current count value generators 110-1~110-$n$; and the current scheduling result generated by the EDD scheduler 120 for the $K^{th}$ time slot is treated as the previous scheduling result for the $(K+1)^{th}$ time slot and outputted to the N current count value generators **110-1~110-*n*. In addition, the parameter setting of the requester MGk can be determined according to the transmission mode (e.g., the line rate mode or the oversubscription mode) of the requester MGk, the demand bandwidth of the requester MGk, and a core bandwidth (e.g., a core bandwidth of a network device including the TDM scheduler 100**). For example, in a circumstance that the core bandwidth is less than the sum of the demand bandwidths of the N requesters, the parameter setting (especially the setting for the aforementioned counting range) of all requesters as a whole should preferentially satisfy total bandwidth demands of the requesters in the line rate mode and then make all-out effort to serve partial bandwidth demands of the requesters in the oversubscription mode.

Please refer to FIG. 1. The EDD scheduler 120 is configured to generate a current scheduling result according to the N current count values MG1_DCNT_VAL~MGn_DCNT_VAL and a predetermined urgency decision rule, and is optionally configured to generate the current scheduling result further according to a demand status (e.g., a status of a buffer indicating whether any packet is waiting to be transmitted) of each of at least a part of the N requesters MG1~MGn and further according to the transmission modes (e.g., the line rate mode and/or the oversubscription mode) of all the requesters. For example, an extreme value (e.g., the minimum value of the N current count values when the predetermined counting rule is a down-counting rule, or the maximum value of the N current count values when the predetermined counting rule is an up-counting rule) of the N current count values is related to one of the N requesters (hereafter referred to as a first target requester) in a time slot, and the EDD scheduler 120 selects the first target requester as a top-priority target in the time slot according to the predetermined urgency decision rule; however, if the EDD scheduler 120 finds that the first target requester has no need to be served preferentially in accordance with the predetermined urgency decision rule, the EDD scheduler 120 can select one of the other requesters (hereafter referred to as a second target requester) as the top-priority target in accordance with the predetermined urgency decision rule. The current count value related to the second target requester may be one of the following:

(1) The extreme value of the N current count values. In this circumstance, the service priority of the second target requester is lower than the service priority of the first target requester, but higher than the service priority of any other requesters having current count values related to the extreme value. The EDD scheduler 120 learns the service priorities of the N requesters from predetermined priority rankings.

(2) The secondary extreme value of the N current count values (e.g., a secondary minimum/maximum value of the N current count values). In this circumstance, each of the requesters except the second target requester is related to a current count value different from (smaller/larger than) the secondary extreme value, or the service priority of the second target requester is higher than the service priority of any other requesters having current count values related to the secondary extreme value.

Figure 3:
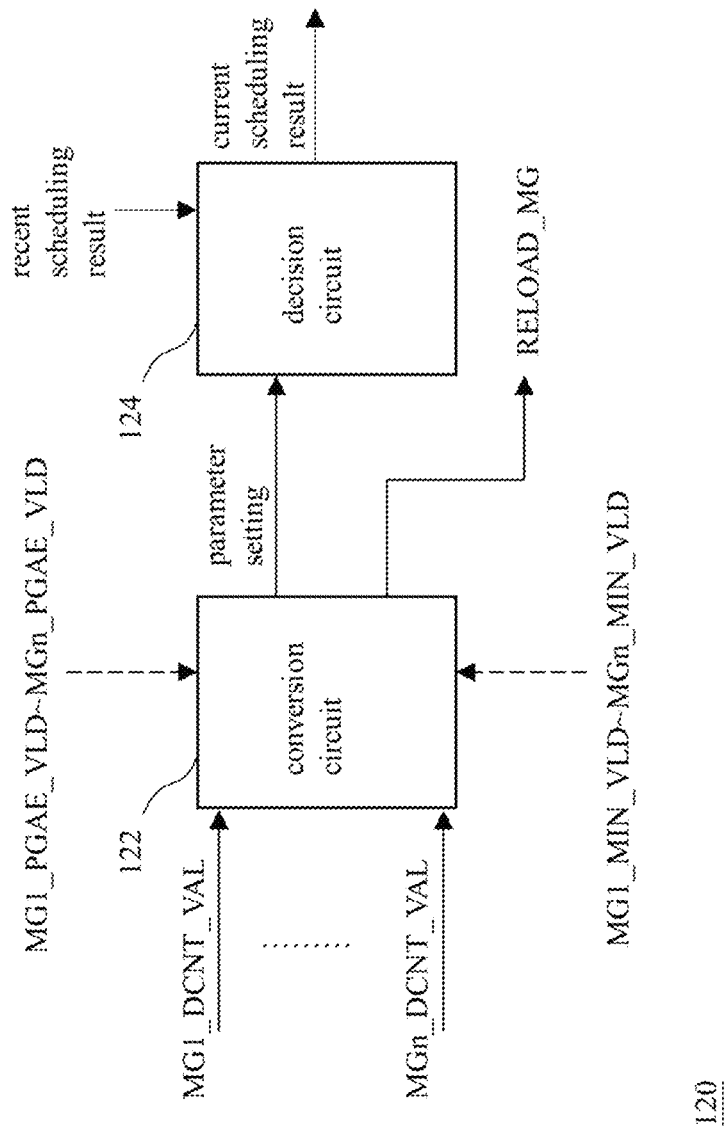
FIG. 3 shows an embodiment of the earliest due date (EDD) scheduler of FIG. 1.

FIG. 3 shows an embodiment of the EDD scheduler 120 of FIG. 1. As shown in FIG. 3, the EDD scheduler 120 includes a conversion circuit 122 and a decision circuit 124. The conversion circuit 122 is configured to convert the N current count values into N priority values according to a predetermined conversion rule. The decision circuit 124 is configured to generate the current scheduling result according to the N priority values. In this embodiment, the decision circuit 124 selects a requester related to the extreme value (e.g., the minimum/maximum value) of the N priority values as the top-priority target.

Please refer to FIG. 3. In an exemplary implementation, the conversion circuit 122 refers to the demand status MGk_PGAE_VLD (1≤k≤n) (e.g., a status of a buffer for storing packets waiting to be transmitted) of each requester MGk to generate the N priority values. The demand status is in a first state or a second state. The first state indicates that at least one packet is waiting to be transmitted. The second state indicates that no packet is waiting to be transmitted, and requesters in the second state have no need to be served preferentially; accordingly, the conversion circuit 122 can optionally convert the current count value of each of these requesters into a minimum priority value that can be predetermined according to the demand for implementation. In addition, in regard to a requester MGk having no need to be served preferentially and giving up its transmission opportunity in a time slot, the conversion circuit 122 can output a reload signal RELOAD_MG to load the counting circuit **114-*k*** of the requester MGk with its initial counting value as the current count value of the requester MGk in a next time slot.

Please refer to FIG. 3. In an exemplary implementation, the conversion circuit 122 refers to a minimum service interval state value MGk_MIN_VLD (1≤k≤n) of each of the N requesters to generate the N priority values. The minimum service interval state value indicates whether a requester of the N requesters has waited to be served for a period longer than a time threshold; on condition that the requester has waited to be served for a period longer than the time threshold (i.e., when the minimum service interval state value for this requester is equal to a specific value as mentioned in a later paragraph), the requester is eligible to be the top-priority target; and on condition that the requester has not waited to be served for a period longer than the time threshold, the conversion circuit 122 can optionally convert the current count value of the requester into the minimum priority value.

Please refer to FIG. 3. In an exemplary implementation, as to a requester in the line rate mode who does not give up its transmission opportunity and reaches the aforementioned time threshold, if its current count value is not equal to the extreme value within its counting range, the conversion circuit 122 converts the current count value into the minimum priority value according to the predetermined conversion rule, or else treats the current count value as this requester's priority value.

It should be noted that the minimum service interval state value MGk_MIN_VLD can be generated by the current count value generator **110-*k*. For example, the parameter setting for the requester MGk includes a minimum service interval value $MCNT_k$ (e.g., a positive integer) of the requester MGk; the current count value generator 110-*k* is loaded with the minimum service interval value $MCNT_k$ in the beginning, and the current count value generator 110-*k* subtracts one from the minimum service interval value $MCNT_k$ every time slot; when the value $MCNT_k$ does not reach zero, the minimum service interval state value generated by the current count value generator 110-*k* is a first value (e.g., zero) indicating that the requester MGk cannot be the top-priority target yet; and when the value $MCNT_k$ reaches zero, the minimum service interval state value generated by the current count value generator 110-*k*** is a second value (e.g., one) indicating that the requester MGk is eligible to be the top-priority target.

Figure 4:
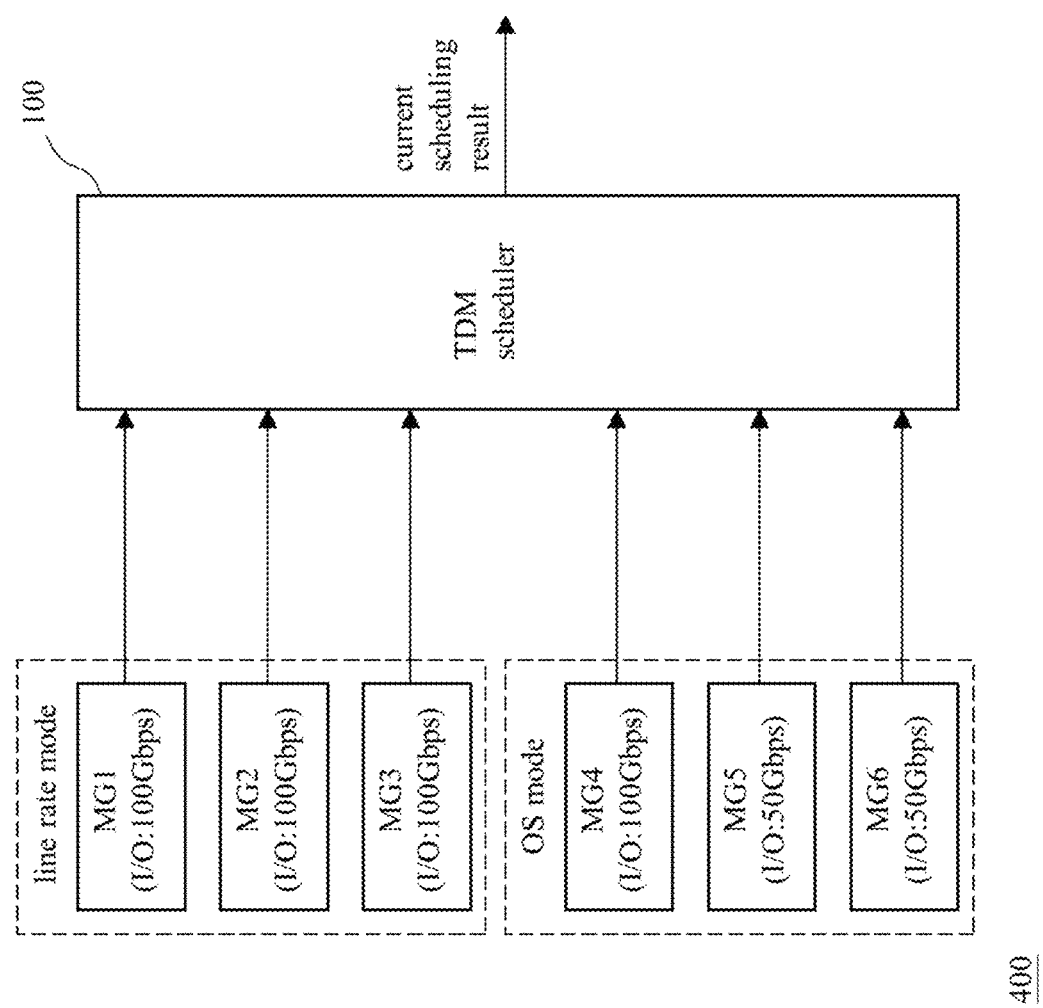
FIG. 4 shows an exemplary application adopting the TDM scheduler of FIG. 1.

FIG. 4 shows an exemplary application adopting the TDM scheduler 100 of FIG. 1. In this exemplary application, the TDM scheduler 100 is included in an Ethernet switch 400. The core bandwidth of the switch 400 (hereafter referred to as switch core bandwidth) is 400 Gbps. The TDM scheduler 100 is configured to allocate time slots to six requesters MG1~MG6 (e.g., six Ethernet transmission ports) so as to allow them to transmit packets within their respective allocated time slots, wherein the I/O bandwidth (a.k.a. demand bandwidth) of each of the requesters MG1~MG4 is 100 Gbps, and the I/O bandwidth of each of the requesters MG5~MG6 is 50 Gbps, the requesters MG1~MG3 are in the line rate mode, and the requesters MG4~MG6 are in the oversubscription mode (OS mode). Based on the modes in which the requesters MG1~MG6 stay, the TDM scheduler 100 allocates 100 Gbps of the switch core bandwidth to each of the requesters MG1~MG3 in the line rate mode, and allocates the remaining bandwidth (i.e., 400 Gbps minus 3×100 Gbps) of the switch core bandwidth to the requesters MG4~MG6.

Please refer to FIG. 4. The TDM scheduler 100 can carry out the aforementioned time slot allocation through the parameter setting of each requester. For example, the TDM scheduler 100 or an external device (not shown) can determine that the counting range for each of the requesters MG1~MG4 equals to $$\frac{400 \text{ Gbps (total core bandwidth)}}{100 \text{ Gbps (individual demand bandwidth)}} = 4$$

(e.g., a range from three to zero, which denotes one quarter of the total switch core bandwidth) by calculation or setting, determine that the counting range for the requester MG4 equals to $$\frac{400 \text{ Gbps (total core bandwidth)}}{\left(\frac{100 \text{ Gbps (total bandwidth for } OS \text{ mode)}}{\left(200 \text{ Gbps}\left(\frac{\text{total demand bandwidth}}{\text{of requesters in } OS \text{ mode}}\right)\right)}\right)} = 8$$

(e.g., a range from eight to one, which denotes one-eighth of the total switch core bandwidth) by calculation or setting, and determine that the counting range for each of the requesters MG5~MG6 equals to $$\frac{400 \text{ Gbps (total core bandwidth)}}{\left(\frac{100 \text{ Gbps (total bandwidth for } OS \text{ mode)}}{\left(200 \text{ Gbps}\left(\frac{\text{total demand bandwidth}}{\text{of requesters in } OS \text{ mode}}\right)\right)}\right)} = 16$$

(e.g., a range from sixteen to one, which denotes one-sixteenth of the total switch core bandwidth) by calculation or setting. It should be noted that those having ordinary skill in the art can implement the above-mentioned calculation/setting with a known/self-developed circuit. It should also be noted that if a calculated counting range is a whole number with a decimal, the TDM scheduler 100/external device can chop the decimal unconditionally, but the present invention is not limited thereto.

FIG. 5 shows a time slot allocation result of the exemplary application of FIG. 4. Each time slot is allocated to a top-priority target (e.g., a select transmission port) so that the top-priority target is allowed to transmit packets in the time slot. As shown in FIG. 5, service priorities of the requesters MG1~MG6 are as follows: MG1>MG2>MG3>MG4>MG5>MG6. The service priorities are determined according to predetermined priority rankings that are arranged according to the following: the priority ranking of any requester in the line rate mode being higher than the priority ranking of any requester in the oversubscription mode; and on the basis of the above, the priority ranking of any requester asking for more bandwidth being higher than the priority ranking of any requester asking for less bandwidth. Of course the predetermined priority rankings can be arranged in another manner according to the demand for implementation. FIG. 5 shows that:

(1) The initial values of all requesters MG1~MG6 (i.e., the current count values of all requesters MG1~MG6 in the beginning) are the extreme values (i.e., the minimum values here) in these requesters' respective counting ranges. It should be noted that the extreme value (e.g., zero) of a requester in the line rate mode is different from the extreme value (e.g., one) of a requester in the oversubscription mode so as to prioritize the time slot allocation for the requester in the line rate mode.

(2) The TDM scheduler 100 (especially the EDD scheduler 120 therein) selects an extreme value (i.e., the minimum value) from the six current count values MG1_DCNT_VAL~MG6_DCNT_VAL and treats the requester related to this extreme value as a top-priority target (e.g., the requester MG1 related to the minimum value "0" in the $0^{th}$ time slot); and if several current count values of the six current count values are equal to the extreme value, the TDM scheduler 100 selects one of the requesters related to the extreme value as the top-priority target according to the aforementioned predetermined priority rankings, wherein the select requester has the highest ranking according to the aforementioned predetermined priority rankings.

(3) On the basis of (2), after the top-priority target is selected, all the current count values in a $K^{th}$ time slot are used as the previous count values in the $(K+1)^{th}$ time slot, and the TDM scheduler 100 (especially the N current count value generators 110-1~110-$n$ therein) generates the current count values for the $(K+1)^{th}$ time slot according to the previous count values in the $(K+1)^{th}$ time slot. More specifically, the TDM scheduler 100 executes the following operations:

(i) retrieving the initial count value of a requester treated as the top-priority target in the $K^{th}$ time slot (e.g., the initial count value "3" of the requester MG1 treated as the top-priority target in the $0^{th}$ time slot) as this requester's current count value in the $(K+1)^{th}$ time slot;

(ii) if the previous count value of a non-select requester (i.e., any requester that is not selected as the top-priority target in the $K^{th}$ time slot) in the $(K+1)^{th}$ time slot is not the minimum value in this requester's counting range, subtracting the aforementioned predetermined value/compensation value from the previous count value and thereby obtaining the current count value of this non-select requester in the $(K+1)^{th}$ time slot, wherein the current count value approaches the extreme value in comparison with the previous count value;

(iii) if the previous count value of a non-select requester in the $(K+1)^{th}$ time slot is the minimum value in this requester's counting range, treating the previous count value as the current count value of this non-select requester in the $(K+1)^{th}$ time slot (i.e., keeping the current count value of this requester unchanged in the meantime); and (iv) using the TDM scheduler 100 (especially the EDD scheduler 120 therein) to select an extreme value (i.e., the minimum value here) from the six current count values prepared for the $(K+1)^{th}$ time slot, and selecting the requester related to the extreme value as the top-priority target for the $(K+1)^{th}$ time slot.

(4) In the items (2)~(3), the TDM scheduler 100 (especially the EDD scheduler 120 therein) optionally refers to a demand status of each of at least a part of the requesters MG1~MG6 as mentioned in the preceding paragraph, and thereby determines the top-priority target. It should be noted that for a requester having no need to be served preferentially in the $K^{th}$ time slot, if this requester is selected as the top-priority target first and it is set in the line rate mode, the TDM scheduler 100 will load the requester with its initial count value as its current count value in the $(K+1)^{th}$ time slot. It should also be noted that if a requester in the line rate mode has no need to be served preferentially, the assignment of its transmission opportunity can be restricted to a requester in the oversubscription mode, but the present invention is not limited thereto.

(5) In the items (2)~(3), the TDM scheduler 100 (especially the EDD scheduler 120 therein) optionally refers to the minimum service interval state value of each of the requesters MG1~MG6 as mentioned in the preceding paragraph, and thereby determines the top-priority target.

It should be noted that although the TDM scheduler 100 (especially the N current count value generators 110-1~110-n therein) in the exemplary application of FIGS. 4-5 adopts a down-counting rule, those having ordinary skill in the art can appreciate how to apply an up-counting rule according to the present disclosure; accordingly, repeated and redundant description is omitted here.

FIG. 6 shows that a compensation value is applied to a time slot allocation result in some circumstance to prevent unfair time slot allocation. In FIG. 6, the requesters MG1~MG2 are set in the oversubscription mode, wherein the counting range for the requester MG1 is from five to one and the counting range for the requester MG2 is from ten to one. Please refer to FIG. 6; in a first circumstance (e.g., a circumstance that many requesters contend for a time slot), the requester MG1 obtains one transmission opportunity (i.e., the requester MG1 being selected as the top-priority target) every five time slots, the requester MG2 obtains one transmission opportunity every ten time slots, and each of the requesters MG1~MG2 obtains its transmission opportunity when its current count value is the minimum value in its counting range. In a second circumstance (e.g., a circumstance that a few requesters contend for a time slot), the requester MG1 obtains one transmission opportunity every four time slots, and the requester MG2 obtains one transmission opportunity every eight time slots. In this circumstance, the requester MG1 obtains its transmission opportunity when its current count value is not equal to the minimum value in its counting range, and thus when the requester MG1 obtains "the transmission opportunity in the $K^{th}$ time slot" (e.g., the $4^{th}$ time slot in the second circumstance in FIG. 6), the current count value of the requester MG2 in the $(K+1)^{th}$ time slot can be obtained in the following manner: subtracting the predetermined value (i.e., the value "one" here) from the current count value of the requester MG2 in the $K^{th}$ time slot to obtain a calculated value, and then subtracting the difference between "the current count value of the requester MG1 in the $K^{th}$ time slot" and "the minimum value (i.e., the value "one") in the counting range for the requester MG1" from the calculated value to obtain the current count value of the requester MG2 in the $(K+1)^{th}$ time slot, wherein the sum of the predetermined value and the difference is used as the compensation value.

Figure 7:
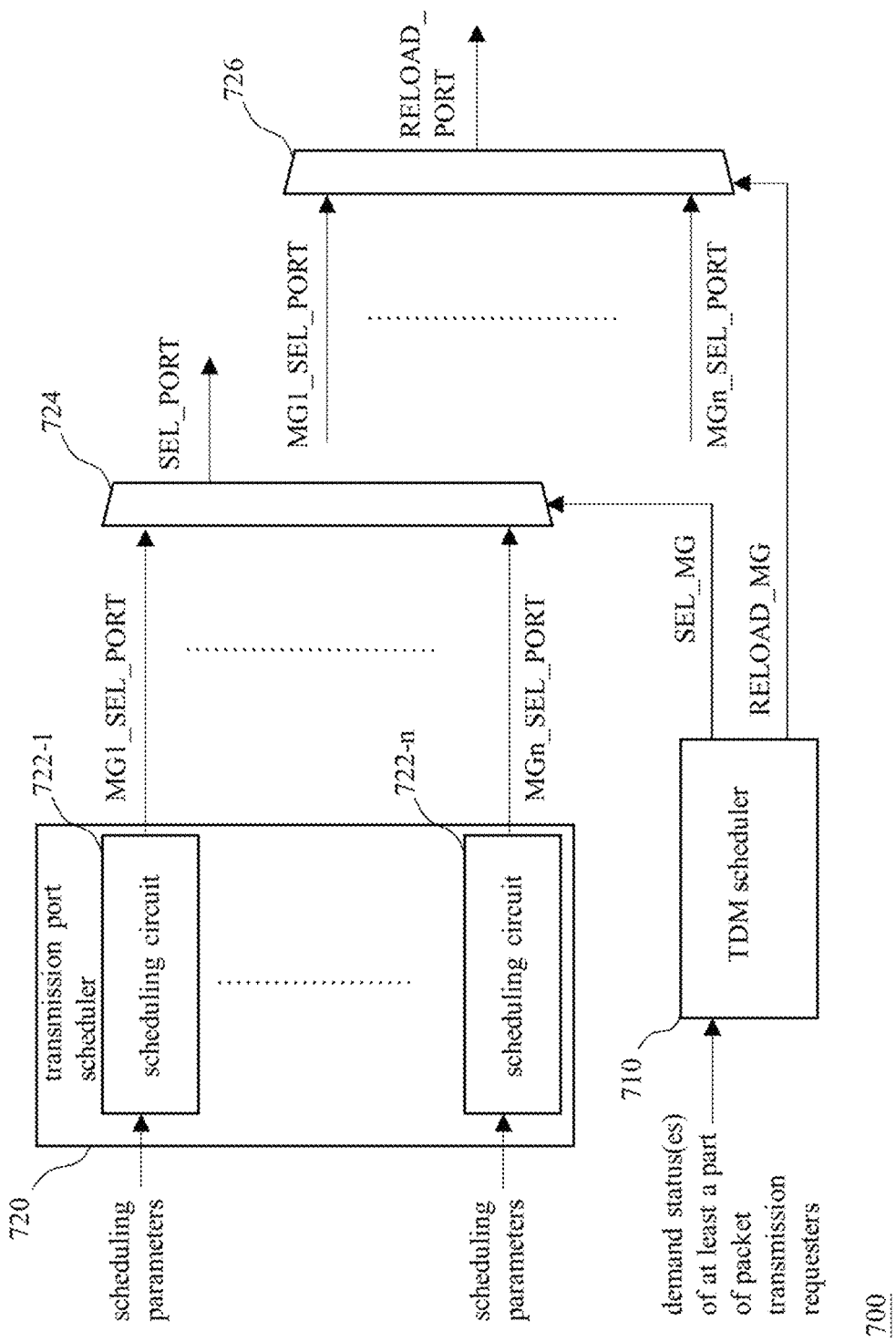
FIG. 7 shows an embodiment of the TDM scheduling device of the present disclosure.

FIG. 7 shows an embodiment of the TDM scheduling device of the present disclosure capable of determining service order for serving N packet transmission requester groups MG1~MGn. The embodiment of FIG. 7 is applicable to a situation that at least one of the N packet transmission requester groups MG1~MGn includes multiple transmission ports. The TDM scheduling device 700 of FIG. 7 can be applied to a network device (e.g., an Ethernet switch) and includes a TDM scheduler 710 (e.g., the TDM scheduler 100 of FIG. 1) and a transmission port scheduler 720. The TDM scheduler 710 can select one of the N packet transmission requester groups MG1~MGn as taught/suggested in the preceding paragraphs, and the transmission port scheduler 720 is configured to select one of M transmission ports of the select packet transmission requester group, wherein the M is a positive integer.

Please refer to FIG. 7. The transmission port scheduler 720 includes N scheduling circuits 722-1~722-n; a first multiplexer 724 and a second multiplexer 726 can be included in or independent of the transmission port scheduler 720. Each scheduling circuit 722-$k$ ($1 \leq k \leq n$) is configured to serve a packet transmission requester group (hereafter referred to as requester group for concision) MGk ($1 \leq k \leq n$) including at least one transmission port. Each scheduling circuit 722-$k$ is configured to output a transmission port selection signal MGk_SEL_PORT ($1 \leq k \leq n$) indicative of a transmission port of the requester group MGk according to scheduling parameters and a predetermined algorithm (e.g., a known/self-developed weighted round robin (WRR) algorithm); accordingly, the N scheduling circuits 722-1~722-n output N transmission port selection signals MG1_SEL_PORT~MGn_SEL_PORT indicative of N transmission ports. In the current embodiment, each scheduling circuit 722-$k$ receives scheduling parameters including: the aforementioned demand status of each transmission port of the requester group MGk; a weighting of each transmission port of the requester group MGk; a parameter indicating the mode (i.e., the line rate mode or the oversubscription mode) in which the requester group MGk stays, wherein this parameter can be provided by the TDM scheduler 710; and the outputs of the first multiplexer 724 and the second multiplexer 726. In addition, if the requester group MGk operates in the oversubscription mode, the scheduling circuit 722-$k$ adopts a known WRR algorithm as the predetermined algorithm; and if the requester group MGk operates in the line rate mode, the scheduling circuit 722-$k$ adopts a TDM WRR algorithm as the predetermined algorithm. The difference between the WRR algorithm and the TDM WRR algorithm includes that the TDM WRR algorithm does not care whether the transmission port of the requester group MGk needs to forward packets.

Please refer to FIG. 7. According to a requester group selection signal SEL_MG included in the current scheduling result outputted from the TDM scheduler 710 for identifying a top-priority target, the first multiplexer 724 outputs a select port signal SEL_PORT indicating that one of the N transmission ports is selected as a select transmission port, and thereby allows the select transmission port to transmit packets, wherein the top-priority target is one of the N requester groups, and the select port is one of the M transmission port(s) of the top-priority target.

Please refer to FIG. 7. According to a reload signal RELOAD_MG included in the current scheduling result outputted from the TDM scheduler 710, the second multiplexer 726 outputs a transmission port reload signal RELOAD_PORT to indicate a $Y^{th}$ transmission port (i.e., the transmission port pertaining to a requester giving up its transmission opportunity, if any) of the N transmission ports, and thereby requests a $Y^{th}$ scheduling circuit of the N scheduling circuits in connection with the $Y^{th}$ transmission port to lower the service priority of the $Y^{th}$ transmission port according to the predetermined algorithm, wherein the Y is a positive integer.

Since those having ordinary skill in the art can appreciate the detail and modification of the embodiment of FIG. 7 by referring to the disclosure of the embodiments of FIGS. 1-6 and known/self-developed algorithms, repeated and redundant description is omitted here.

It should be noted that people having ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the present invention can automatically allocate time slots to multiple packet transmission requesters, and thereby economize manpower greatly and work out a plan of time slot allocation quickly.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A time-division multiplexing (TDM) scheduler capable of determining service order for serving N packet transmission requesters, wherein the N is an integer greater than one, the N packet transmission requesters include a first requester and a second requester, and the TDM scheduler comprises:
N current count value generators configured to serve the N packet transmission requesters respectively, wherein each of the N current count value generators is configured to generate a count value, and the N current count value generators are configured to generate N current count values and include:
a first count value generator including:
a first storage circuit configured to store first parameter setting for the first requester; and
a first counting circuit configured to update a first previous count value according to first input parameters and a predetermined counting rule and thereby generate a first current count value of the N current count values, wherein the first input parameters include the first parameter setting and the first previous count value, the first previous count value is originated from a previous scheduling result, both the first previous count value and the first current count value fall within a first counting range, and the first counting range is dependent on the first parameter setting and includes a first extreme value;

a second count value generator including:
a second storage circuit configured to store second parameter setting for the second requester; and
a second counting circuit configured to update a second previous count value according to second input parameters and the predetermined counting rule and thereby generate a second current count value of the N current count values, wherein the second input parameters include the second parameter setting and the second previous count value, the second previous count value is originated from the previous scheduling result, both the second previous count value and the second current count value fall within a second counting range, and the second counting range is dependent on the second parameter setting and includes a second extreme value; and
an earliest due date (EDD) scheduler configured to generate a current scheduling result according to the N current count values and a predetermined urgency decision rule, wherein the current scheduling result determines the service order for serving the N packet transmission requesters, and the previous scheduling result is generated by the EDD scheduler prior to generation of the current scheduling result.

2. The TDM scheduler of claim 1, wherein both the first extreme value and the second extreme value are minimum/maximum values in their respective counting ranges; the first extreme value is equal to the second extreme value; in a circumstance that the first current count value is an extreme value of the N current count values and the second current count value is not equal to any of the extreme value and the second extreme value, the EDD scheduler selects the first requester as a top-priority target according to the predetermined urgency decision rule; and the extreme value is a minimum/maximum value of the N current count values.

3. The TDM scheduler of claim 2, wherein the first parameter setting includes a first initial count value; after the current scheduling result indicates that the first requester is selected as the top-priority target, the current scheduling result is treated as the previous scheduling result and outputted to the first counting circuit and the second counting circuit, the first current count value is treated as the first previous count value, the second current count value is treated as the second previous count value, then the first counting circuit obtains the first initial count value according to the previous scheduling result to update the first previous count value, and the second count circuit increases/decreases the second previous count value according to the previous scheduling result to update the second previous count value.

4. The TDM scheduler of claim 1, wherein both the first extreme value and the second extreme value are minimum/maximum values in their respective counting ranges; the first extreme value is equal to the second extreme value; in a circumstance that each of the first current count value and the second current count value is an extreme value of the N current count values, the EDD scheduler selects the first requester as a top-priority target according to the predetermined urgency decision rule and predetermined priority rankings of the N packet transmission requesters; the extreme value is a minimum/maximum value of the N current count values; and the predetermined priority rankings indicate that a service priority of the first requester is higher than a service priority of the second requester.

5. The TDM scheduler of claim 4, wherein the first parameter setting includes a first initial count value; after the current scheduling result indicates that the first requester is selected as the top-priority target, the current scheduling result is treated as the previous scheduling result and outputted to the first counting circuit and the second counting circuit, the first current count value is treated as the first previous count value, the second current count value is treated as the second previous count value, then the first counting circuit obtains the first initial count value according to the previous scheduling result to update the first previous count value, and the second count circuit increases/decreases the second previous count value according to the previous scheduling result to update the second previous count value.

6. The TDM scheduler of claim 1, wherein the first requester operates in a line rate mode for packet transmission, and requires a first bandwidth; the second requester operates in an oversubscription mode for packet transmission, and requires a second bandwidth; the TDM scheduler is included in a switch; on condition that the first bandwidth is not narrower than the second bandwidth and the N packet transmission requesters requires a total bandwidth wider than a core bandwidth of the switch, the first counting range is smaller than the second counting range.

7. The TDM scheduler of claim 1, wherein the first requester operates in a line rate mode for packet transmission; the second requester operates in an oversubscription mode for packet transmission; on condition that the predetermined counting rule is a down-counting rule, the first extreme value is smaller than the second extreme value; and on condition that the predetermined counting rule is an up-counting rule, the first extreme value is larger than the second extreme value.

8. The TDM scheduler of claim 1, wherein the N packet transmission requesters include P line rate mode requester(s) and Q oversubscription mode requester(s); each of the P and the Q is an integer between zero and the N, and a sum of the P and the Q is equal to the N; Q current count value(s) of the N current count values is/are related to the Q oversubscription requester(s); the first requester operates in a line rate mode for packet transmission; the second requester operates in an oversubscription mode for packet transmission; on condition that the first current count value is an extreme value of the N current count values, the second current count value is an oversubscription mode extreme value of the Q current count value(s), and the EDD scheduler determines that the first requesters has no need to be served preferentially according to the predetermined urgency decision rule, the EDD scheduler selects the second requester as a top-priority target; and the extreme value and the oversubscription mode extreme value are a smallest value of the N current count values and an oversubscription mode minimum value of the Q current count value(s), or the extreme value and the oversubscription mode extreme value are a maximum value of the N current count values and an oversubscription mode maximum value of the Q current count values(s).

9. The TDM scheduler of claim 1, wherein both the first requester and the second requester operate in an oversubscription mode for packet transmission; the first extreme value is equal to the second extreme value; in a circumstance that the first current count value is an extreme value of the N current count values, the second current count value is a secondary extreme value, and the EDD scheduler determines that the first requester has no need to be served preferentially according to the predetermined urgency decision rule, the EDD scheduler selects the second requester as a top-priority target; the extreme value and the secondary extreme value are a minimum value and a secondary minimum value of the N current count values respectively, or the extreme value and the secondary extreme value are a maximum value and a secondary maximum value of the N current count values respectively.

10. The TDM scheduler of claim 1, wherein both the first requester and the second requester operate in an oversubscription mode for packet transmission; the first extreme value is equal to the second extreme value; in a circumstance that each of the first current count value and the second current count value is an extreme value of the N current count values, predetermined priority rankings of the N packet transmission requesters indicate that a service priority of the first requester is higher than another service priority of the second requester, and the EDD scheduler determines that the first requester has no need to be served preferentially according to the predetermined urgency decision rule, the EDD scheduler selects the second requester as a top-priority target; the extreme value is a minimum/maximum value of the N current count values.

11. The TDM scheduler of claim 1, wherein an extreme value of the N current count values is related to one of the N packet transmission requesters; the extreme value is a minimum/maximum value of the N current count values; and the EDD scheduler selects the one of the N packet transmission requesters related to the extreme value as a top-priority target to be served.

12. The TDM scheduler of claim 11, wherein in a circumstance that X count values of the N current count values are equal to the extreme values and the X is an integer greater than one, the X count values are related to X requesters of the N packet transmission requesters, and the EDD scheduler selects one of the X requesters having a top service priority as the top-priority target according to predetermined priority rankings of the N packet transmission requesters.

13. The TDM scheduler of claim 1, wherein the EDD scheduler generates the current scheduling result further according to a demand status of each of at least a part of the N packet transmission requesters; the demand status is in one of a first state and a second state; the first state is indicative of at least one packet waiting to be transmitted; and the second state is indicative of no packet waiting to be transmitted.

14. The TDM scheduler of claim 13, wherein each of the N packet transmission requesters in the second state is excluded from being the top-priority target.

15. The TDM scheduler of claim 1, wherein the EDD scheduler includes:
  a conversion circuit configured to convert the N current count values into N priority values according to a predetermined conversion rule; and
  a decision circuit configured to generate the current scheduling result according to the N priority values.

16. The TDM scheduler of claim 15, wherein the conversion circuit refers to a demand status of each of the N packet transmission requesters according to the predetermined conversion rule and thereby generates the N priority values; the demand status is in one of a first state and a second state; the first state is indicative of at least one packet waiting to be transmitted; the second state is indicative of no packet waiting to be transmitted; and each of the N packet transmission requesters in the second state is excluded from being a top-priority target.

17. The TDM scheduler of claim 15, wherein the conversion circuit refers to a minimum service interval state value of each of the N packet transmission requesters according to the predetermined conversion rule and thereby generates the N priority values; the minimum service interval state value indicates whether a requester of the N packet transmission requesters in connection with the minimum service interval state value waits to be served for a period longer than a time threshold; and on condition that the requester waits to be served for the time threshold, the requester is eligible to be a top-priority target.

* * * * *